United States Patent
Hong et al.

(10) Patent No.: US 9,685,647 B2
(45) Date of Patent: *Jun. 20, 2017

(54) SEPARATOR INCLUDING COATING LAYER AND BATTERY INCLUDING THE SAME

(71) Applicants: Ki Chul Hong, Uiwang-si (KR); Jae Goo Doh, Uiwang-si (KR); Geon Ja Lim, Uiwang-si (KR); Jun Ho Chung, Uiwang-si (KR)

(72) Inventors: Ki Chul Hong, Uiwang-si (KR); Jae Goo Doh, Uiwang-si (KR); Geon Ja Lim, Uiwang-si (KR); Jun Ho Chung, Uiwang-si (KR)

(73) Assignee: CHEIL INDUSTRIES, INC., Gumi-Si, Kyeongsangbuk-Do (KR)

( * ) Notice: Subject to any disclaimer, the term of this patent is extended or adjusted under 35 U.S.C. 154(b) by 186 days.

This patent is subject to a terminal disclaimer.

(21) Appl. No.: 13/778,259

(22) Filed: Feb. 27, 2013

(65) Prior Publication Data
US 2013/0224552 A1   Aug. 29, 2013

(30) Foreign Application Priority Data

Feb. 29, 2012   (KR) .................... 10-2012-0021141

(51) Int. Cl.
*H01M 2/16*   (2006.01)
*H01M 10/052*   (2010.01)

(52) U.S. Cl.
CPC ......... *H01M 2/1686* (2013.01); *H01M 2/166* (2013.01); *H01M 2/1653* (2013.01); *H01M 10/052* (2013.01)

(58) Field of Classification Search
CPC .................... H01M 2/1686; H01M 2/1646
USPC .................... 429/129–147, 247–255
See application file for complete search history.

(56) References Cited

U.S. PATENT DOCUMENTS

| | | | |
|---|---|---|---|
| 7,662,517 B2 | 2/2010 | Lee et al. | |
| 2002/0192561 A1 | 12/2002 | Noh | |
| 2006/0105244 A1* | 5/2006 | Kejha | H01G 9/02 429/242 |
| 2009/0291360 A1* | 11/2009 | Kim | H01M 2/1653 429/145 |

(Continued)

FOREIGN PATENT DOCUMENTS

| | | |
|---|---|---|
| CN | 1381911 A | 11/2002 |
| CN | 102088067 A | 6/2011 |

(Continued)

OTHER PUBLICATIONS

Search Report mailed Jun. 10, 2013 in corresponding European Patent Application No. 13156811.5.

(Continued)

*Primary Examiner* — Patrick Ryan
*Assistant Examiner* — Kiran Akhtar
(74) *Attorney, Agent, or Firm* — Lee & Morse, P.C.

(57) ABSTRACT

A separator includes a polyolefin base film and a coating layer, the coating layer containing inorganic particles having an average particle size of about 1 nm to about 700 nm and an organic binder of a polyvinylidene fluoride homopolymer, the coating layer having a density of about 1.2 g/cm$^3$ to about 2 g/cm$^3$, the coating layer being disposed on one or both sides of the base film.

12 Claims, 2 Drawing Sheets

(56) References Cited

U.S. PATENT DOCUMENTS

| | | | |
|---|---|---|---|
| 2010/0209757 A1 | 8/2010 | Ooyama et al. | |
| 2010/0285348 A1* | 11/2010 | Murata | B32B 27/20 |
| | | | 429/144 |
| 2011/0052987 A1 | 3/2011 | Katayama et al. | |
| 2011/0293976 A1* | 12/2011 | Chiba | H01M 2/166 |
| | | | 429/94 |
| 2013/0017429 A1* | 1/2013 | Ha | H01M 2/1653 |
| | | | 429/144 |

FOREIGN PATENT DOCUMENTS

| | | | | |
|---|---|---|---|---|
| EP | 1-011-157 A2 | 6/2000 | | |
| JP | 2004-111160 A | 4/2004 | | |
| JP | 2006-120462 A | 5/2006 | | |
| KR | 10-2006-0072065 A | 6/2006 | | |
| KR | 100727248 B1 | 6/2007 | | |
| WO | WO2011/115376 | * | 9/2011 | ............. H01M 2/14 |
| WO | WO2011/159087 | * | 12/2011 | ........ H01M 10/0525 |

OTHER PUBLICATIONS

Office Action issued Jun. 20, 2014 in corresponding Korean Patent Application No. 10-2012-0021140.
Provisional double patenting rejection of claims; USPTO Office action mailed Mar. 4, 2016, in U.S. Appl. No. 13/778,332.
U.S. Appl. No. 13/778,332, filed Feb. 27, 2013.

* cited by examiner

SEPARATOR INCLUDING COATING LAYER AND BATTERY INCLUDING THE SAME

The present application claims priority under 35 U.S.C. §119 to Korean Patent Application No. 10-2012-0021141, filed on Feb. 29, 2012, in the Korean Intellectual Property Office, and entitled: "Separator Including Density-Controlled Coating Layer and Battery Including the Same," which is incorporated by reference herein in its entirety.

BACKGROUND

1. Field

Embodiments relate to a separator including a coating layer and a battery including the same.

2. Description of the Related Art

Recently, electrochemical batteries have been developed to have a lighter and thinner structure to improve portability of electronic devices such as mobile devices and notebook computers while ensuring high output and high capacity for use in electric cars and the like.

SUMMARY

Embodiments are directed to a separator, including a polyolefin base film, and a coating layer, the coating layer containing inorganic particles having an average particle size of about 1 nm to about 700 nm and an organic binder of a polyvinylidene fluoride homopolymer, the coating layer having a density of about 1.2 $g/cm^3$ to about 2 $g/cm^3$, the coating layer being disposed on one or both sides of the base film.

The polyvinylidene fluoride homopolymer may have a weight average molecular weight of about 1,000,000 g/mol or more.

The polyvinylidene fluoride homopolymer may have a weight average molecular weight of about 1,000,000 g/mol to about 1,200,000 g/mol.

The coating layer may further contain an organic binder of a polyvinylidene fluoride-hexafluoropropylene copolymer.

The polyvinylidene fluoride-hexafluoropropylene copolymer may have a weight average molecular weight of about 800,000 g/mol or less.

The coating layer may have a thickness of 10 μm or less.

The inorganic particles may include one or more of $Al_2O_3$ particles, $SiO_2$ particles, $B_2O_3$ particles, $Ga_2O_3$ particles, $TiO_2$ particles, or $SnO_2$ particles.

The polyolefin base film may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The coating layer may have a peel strength to glass of about 50 $gf/cm^2$ or more.

An adhesive strength between the coating layer and electrodes of a battery may be about 20 $gf/cm^2$ or more.

The battery may be a lithium ion rechargeable battery.

The electrodes may include a positive electrode and a negative electrode, the positive electrode may be selected from the group of a lithium cobalt oxide electrode, a lithium nickel cobalt manganese oxide electrode, a lithium manganese oxide electrode, a lithium iron phosphate electrode, and a lithium nickel oxide electrode, and the negative electrode may be selected from the group of a crystalline carbon electrode and an amorphous carbon electrode Embodiments are also directed to an electrochemical battery, including a positive electrode, a negative electrode, the separator according to an embodiment, and an electrolyte.

The electrochemical battery may be a lithium ion rechargeable battery.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Definition: Molecular weight is a measure of the sum of the atomic weights of the atoms in a molecule.

Definition: Particle size is measured according to a method of a laser scattering.

Definition: Density is calculated by Expression 1.

Density=(total weight of a separator per unit area−weight of a base film per unit area)/thickness of coating layer.     [Expression 1]

In Expression 1, the total weight of a separator is an weight of a separator including coating layer, and the total weight of a separator and the weight of a base film are measured by using a Precision Balance.

Further, in all physical data within the specification, the temperature if not otherwise stated is room temperature.

Figure 1:
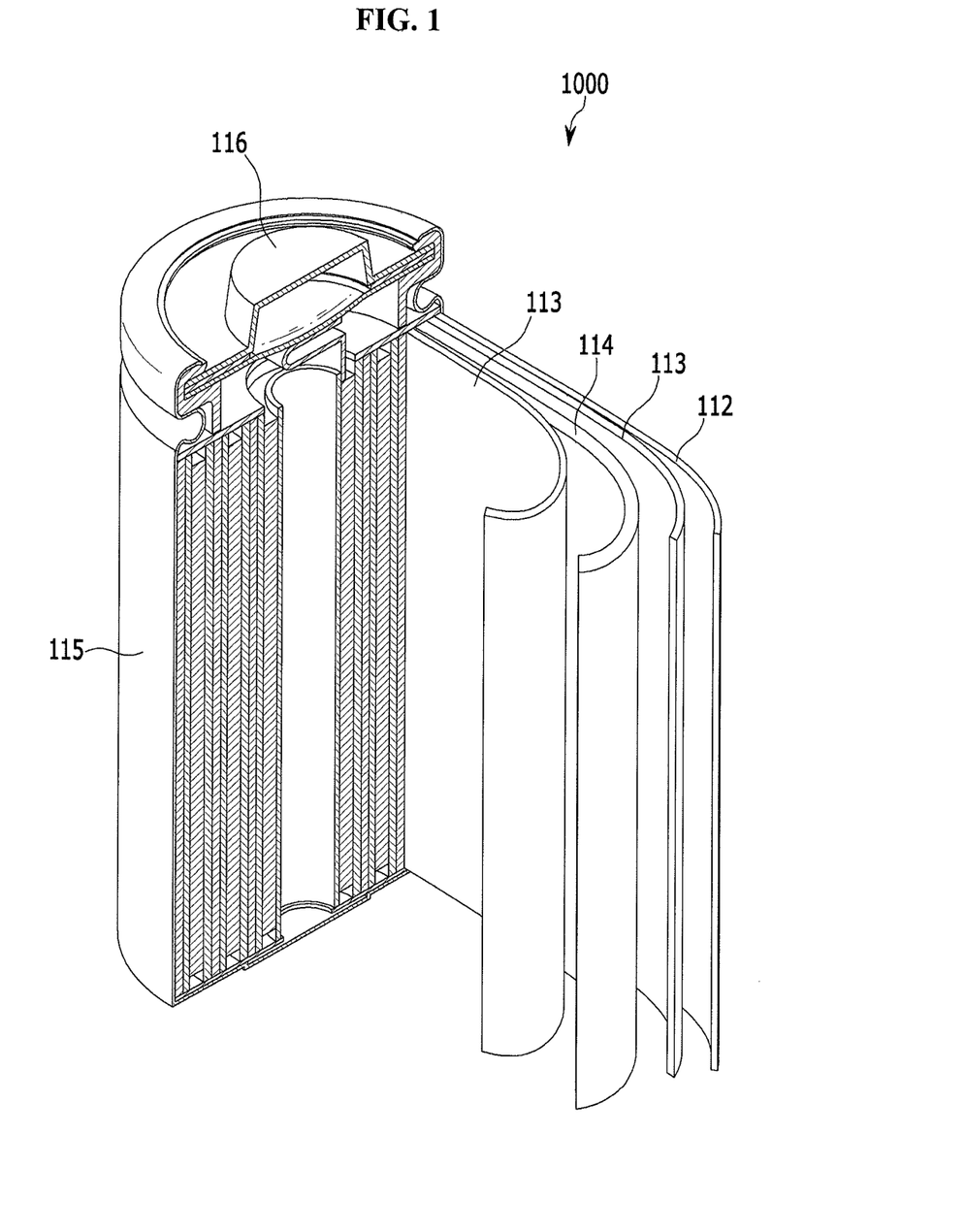
FIG. 1 illustrates a schematic view of a rechargeable battery according to an embodiment.

FIG. 1 illustrates a schematic view of a rechargeable battery according to an embodiment.

Referring to FIG. 1, a rechargeable battery 1000 according to an embodiment may include an electrode assembly including a positive electrode 114, a negative electrode 112 (facing the positive electrode 114), a separator 113 (interposed between the positive electrode 114 and negative electrode 112), an electrolyte solution (not shown), a battery case 115 (accommodating the electrode assembly), and a sealing member 116 (sealing the battery case 115). FIG. 1 shows a cylindrical rechargeable battery as an example; embodiments may be applied to other types of batteries, e.g., prismatic, etc.

Figure 2:
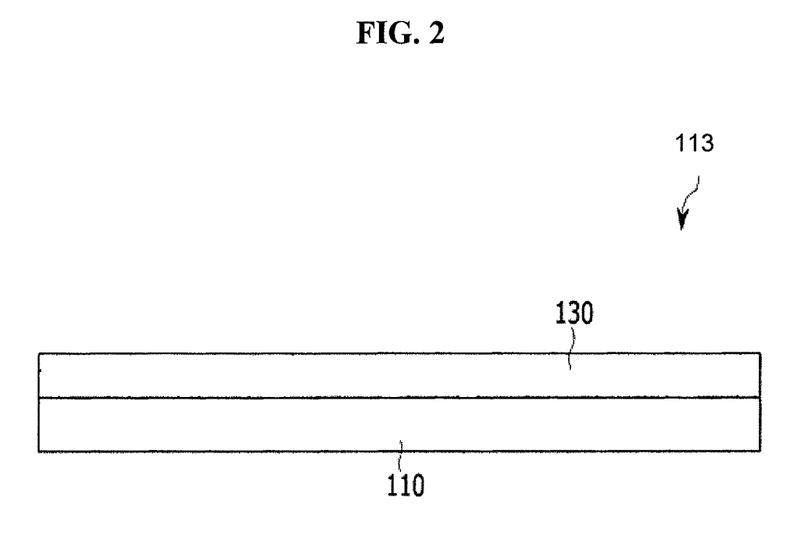
FIG. 2 illustrates a cross-sectional view of a separator for a rechargeable battery according to an embodiment.

FIG. 2 illustrates a cross-sectional view of a separator for a rechargeable battery according to an embodiment.

In the example embodiment shown in FIG. 2, the separator 113 for the rechargeable battery 1000 according to an embodiment may include a base film 110 and a coating layer 130 on one side (or both sides) of the base film 110.

The separator 113 may include a polyolefin base film and the coating layer 130 thereon. The coating layer 130 may include an organic and inorganic mixture formed on one or both sides of the base film 110. The coating layer 130 may contain an organic binder of a polyvinylidene fluoride homopolymer and inorganic particles having an average particle size of about 1 nm to about 700 nm. The coating layer 130 may have a density of about 1.2 g/cm$^3$ to about 2 g/cm$^3$.

The polyvinylidene fluoride (PVdF) homopolymer may have a weight average molecular weight of about 1,000,000 g/mol or more, e.g., about 1,000,000 g/mol to about 1,200,000 g/mol. Within this molecular weight range, the polyvinylidene fluoride homopolymer may improve adhesion between the coating layer and the base film, which may help achieve efficient suppression of thermal shrinkage of the polyolefin base film, which may be vulnerable to heat, and may provide good adhesion between the coating layer and electrodes, which may help achieve efficient suppression of short circuit between the electrodes. Also, within this molecular weight range, the polyvinylidene fluoride homopolymer may be smoothly dissolved in dimethylformamide (DMF), and thus may prevent excessive use of DMF and possible defects during a dry process.

The inorganic particles may include one or more of $Al_2O_3$ particles, $SiO_2$ particles, $B_2O_3$ particles, $Ga_2O_3$ particles, $TiO_2$ particles, $SnO_2$ particles, etc (these may be used alone or in combination of two or more thereof). In an implementation, the inorganic particles are $Al_2O_3$ particles.

The inorganic particles may have an average particle size of, e.g., about 1 nm to about 700 nm, e.g., about 100 nm to about 500 nm. Within this size range, the inorganic particles may prevent deterioration in coating processibility and dispersion within a coating agent, deterioration in mechanical properties, and increase in electric resistance by allowing suitable thickness adjustment of the coating layer through increase in density of the coating layer. Further, pores of a suitable size may be created in the coating layer, which may lower the likelihood of internal short circuit upon charge and discharge of the battery.

In an implementation, the inorganic particles may be prepared in the form of an inorganic dispersion that is obtained by mixing the inorganic particles in a suitable solvent, for example, acetone.

The inorganic particles may be dispersed in a suitable size using a ball mill or a bead mill. In an implementation, the inorganic particles may be used after being dispersed using the bead mill. The bead mill may be advantageous by pulverizing the inorganic material to a desired particle size within a desirable period of time, and may make it easier to adjust the density of the coating layer.

In an implementation, dispersion of $Al_2O_3$ particles may be carried out by an in-line system of a pre-mixer tank filled with acetone and bead mills arranged to allow the acetone to circulate between the pre-mixer tank and the bead mills. The $Al_2O_3$ particles may be added in an amount of about 25 wt % with respect to the acetone at a loading speed of about 2 kg/hr into the pre-mixer tank, followed by milling for a predetermined period of time.

The inorganic particles may be stirred using the ball mill or bead mill for about 0.5 to about 4.5 hours for dispersion of the inorganic particles, e.g., about 1 to about 3.5 hours. Within this range, the inorganic particles may be sufficiently dispersed and may have a suitable average particle size in the coating agent, which may enable formation of a coating layer having a high density.

In an embodiment, the coating layer may further contain a polyvinylidene fluoride-hexafluoropropylene copolymer as an organic binder component. The polyvinylidene fluoride-hexafluoropropylene copolymer may have a weight average molecular weight of about 800,000 g/mol or less, e.g., about 600,000 g/mol to about 800,000 g/mol. Within this molecular weight range of the polyvinylidene fluoride-hexafluoropropylene copolymer, the separator may exhibit excellent electrolyte impregnation, which may help achieve efficient output of electricity.

In the polyvinylidene fluoride-hexafluoropropylene copolymer used in the present embodiment, hexafluoropropylene may be present in an amount of about 0.1 to about 40% by weight based on the total weight of the copolymer.

In preparation of the coating agent used in the present embodiment, the polyvinylidene fluoride homopolymer, the polyvinylidene fluoride-hexafluoropropylene copolymer, and the inorganic particles may be dissolved in suitable solvents, respectively, and mixed with each other.

For example, the polyvinylidene fluoride homopolymer may be prepared as a polymer solution that is obtained by dissolving the polyvinylidene fluoride homopolymer in dimethylformamide (DMF). The polyvinylidene fluoride-hexafluoropropylene copolymer may be prepared as a polymer solution that is obtained by dissolving the polyvinylidene fluoride-hexafluoropropylene copolymer in acetone, and the inorganic particles may be prepared as an inorganic dispersion that is obtained by dissolving the inorganic particles in acetone.

The polymer solutions and the inorganic dispersion may be mixed in a suitable solvent to prepare a coating agent.

Solvents used in the present embodiment may include, e.g., ketones such as acetone, or alcohols such as methanol, ethanol, isopropyl alcohol, or the like. These solvents may provide an advantage of allowing easy removal upon drying after coating.

According to the present embodiment, the coating agent may be prepared in the form of a mixture obtained by sufficiently stirring the polymer solutions, the inorganic dispersion, and the solvent using, e.g., a ball mill, a bead mill, or a screw mixer.

The separator according to the present embodiment may be prepared by coating the coating agent on one or both sides of the base film, followed by drying the coating agent.

A suitable coating method may be used to coat the base film with the coating agent. For example, dip coating, die coating, roll coating, or comma coating may be used. These coating processes may be used alone or in combination thereof.

In an embodiment, the coating layer may contain: about 5 to about 10 parts by weight of the polyvinylidene fluoride homopolymer; about 5 to about 20 parts by weight of the polyvinylidene fluoride-hexafluoropropylene copolymer; and about 70 to about 90 parts by weight of the inorganic particles, based on 100 parts by weight of the coating layer in terms of solid content. Within this range, the inorganic particles may provide thermal stability (enabling heat resistance and/or heat dissipation), the organic binder may provide sufficient adhesion, and the coating layer may be formed in a relatively flat shape by preventing deterioration in coating processibility and dispersion of the coating agent. Further, within this content range, the organic binder may prevent an excessive reduction in amount of the inorganic particles while sufficiently improving adhesion of the coating layer, which may provide suitable heat dissipation and heat resistance. Further, within this content range, the inorganic particles may provide effective suppression of thermal shrinkage of the separator through sufficient heat dissipation while allowing the organic binder to be added in a desired amount so as to provide strong adhesion.

According to the present embodiment, the coating layer of the separator may have has a density of about 1.2 g/cm$^3$ to about 2 g/cm$^3$, e.g., about 1.8 g/cm$^3$ to about 2 g/cm$^3$. Within this density range, the coating layer may be formed to a slim thickness while ensuring sufficient adhesion, excellent heat resistance, and heat dissipation.

The density of the coating layer can be calculated using the thickness of the coating layer and the loading amount. In the coating layer, the loading amount of the coating agent means a weight per unit area of the coating layer (g/m$^2$).

The thickness of a separator for a battery may be limited to a predetermined range. Thus, it may be desirable that the loading amount increase to form a coating layer of a higher density in order to allow the coating layer to exhibit sufficient effects for the same area and the same thickness of the coating layer.

According to the present embodiment, the coating layer may have a thickness of about 0.01 μm to about 10 μm, e.g., about 1 μm to about 7 μm. Within this thickness range, the coating layer may be formed to a suitable thickness to have excellent thermal stability and adhesion, and may prevent the separator from being excessively thickened, which may prevent an increase in internal resistance of the battery.

According to the present embodiment, the coating layer may have a loading amount of about 1 g/m$^2$ or more, e.g., about 5 g/m$^2$ to about 9 g/m$^2$.

A suitable method known in the art may be used to measure the loading amount in the coating layer. For example, a prepared coating layer is cut into a size of 10 cm (MD)×20 cm (TD) to prepare specimens, each weight of which is measured using an electronic scale, followed by calculating the loading amount. Calculation results of the loading amount are given in g/m$^2$.

According to the present embodiment, the polyolefin base film may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The polyolefin base film may have a thickness of about 1 μm to about 40 μm, e.g., about 1 μm to about 25 μm. Within this thickness range of the base film, the separator may be formed to a suitable thickness to prevent short circuit of the positive electrode and the negative electrode while improving stability of the battery. If the thickness of the separator exceeds this range, internal resistance of the battery may increase.

In the separator including the coating layer of the organic and inorganic mixture, peel strength between the coating layer and the polyolefin base film may be about 50 gf/cm$^2$ or more. Within this range, the coating layer may have good peeling resistance, and it may be possible to prevent separation of the inorganic particles from the coating layer in a process of assembling the battery using the separator. Further, within this range, the separator may exhibit sufficiently strong adhesion between the coating layer and the base film to prevent shrinkage of the base film due to heat and separation between the coating layer and the base film due to overheating of the battery, which may help prevent a short circuit of the electrodes while improving thermal stability.

A suitable method known in the art may be used to measure the peel strength of the coating layer. For example, the peel strength of the coating layer can be measured as follows: a prepared coating layer is cut into a 1.5 cm×7 cm specimen, which in turn is strongly attached to a glass plate using a transparent double-sided tape (3M), followed by measuring force required to separate the coating layer using a tensile strength tester (UTM; Universal Test Machine).

When the separator including the coating layer of the organic and inorganic mixture according to the present embodiment is applied to an electrochemical battery, the coating layer may exhibit an adhesive strength of about 20 gf/cm$^2$ or more to electrodes of the battery. Within this range, the coating layer and the electrodes may be sufficiently strongly attached together, which may help prevent a short circuit of the positive and negative electrodes. In addition, in production of high output large capacity batteries, the separator may improve stability and lifespan of the batteries.

A suitable method known in the art may be used to measure the adhesive strength between the coating layer and the electrodes of a battery. For example, the adhesive strength between the coating layer and the electrodes can be measured as follows: a prepared separator of the present invention is placed between both electrodes to prepare a battery stack of positive electrode/separator/negative electrode, which in turn is inserted into an aluminum pouch. Then, with an electrolyte injected into the aluminum pouch, the aluminum pouch is sealed and formed into a single-plate cell, which in turn is subjected to a force of 100 kgf/cm$^2$ for 20 seconds at 50° C. and left for 12 hours. Next, after disassembling each of the single-plate cells, the battery stack of the positive electrode, the separator and the negative electrode bonded to each other is cut into a size of 1.5 cm (MD)×7 cm (TD) and attached to a glass plate using a transparent double-sided tape (3M), followed by measuring adhesive strength between the electrodes and the separator using a tensile strength tester (UTM; Universal Test Machine).

The separator including the coating layer of the organic and inorganic mixture may have a thermal shrinkage of about 30% or less in a machine direction (MD) or in a transverse direction (TD), as measured after leaving the separator at 150° C. for 1 hour. Within this range, the separator may effectively prevent short circuit of the electrodes, which may improve stability of the battery.

A suitable method known in the art may be used to measure the thermal shrinkage of the separator. For example, the thermal shrinkage of the separator can be measured as follows: a prepared separator is cut into a size of about 5 cm (width)×about 5 cm (length) and left in a chamber at 150° C. for 1 hour, followed by measuring degrees of shrinkage in MD and TD directions to calculate thermal shrinkage.

Another embodiment provides an electrochemical battery that includes the polyolefin porous separator including the coating layer of the organic and inorganic mixture, a positive electrode, and a negative electrode, and which is filled with an electrolyte.

The battery may be any suitable type of battery. Examples of the electrochemical battery of the present embodiment may include lithium rechargeable batteries, such as lithium metal rechargeable batteries, lithium ion rechargeable batteries, lithium polymer rechargeable batteries, lithium ion polymer rechargeable batteries, and the like.

A suitable method known in the art may be used in manufacture of the electrochemical battery according to the present invention. For example, the electrochemical battery according to the present embodiment may be manufactured by placing the polyolefin separator including the coating layer of the organic and inorganic mixture according to an embodiment between the positive electrode and the negative electrode, and filling a space therebetween with the electrolyte.

The electrodes (positive electrode and negative electrode) of the electrochemical battery according to the present embodiment may be prepared in the form of assemblies of electrode active materials and current collectors, which are combined by a suitable method.

The positive electrode may include a positive electrode active material that allows reversible intercalation and deintercalation of lithium ions. Examples of such positive electrode active materials may include composite metal oxides of lithium and one or more metals such as cobalt, manganese, nickel, etc. The amount of lithium dissolved between metal elements may be determined in various ways. In addition to these metals, the positive electrode active material may further include an element selected from the group of Mg, Al, Co, Ni, K, Na, Ca, Si, Ti, Sn, V, Ge, Ga, B, As, Zr, Mn, Cr, Fe, Sr, V, and rare earth metal elements. In an implementation, the positive electrode may be a composite metal oxide of lithium and a metal selected from the group consisting of Co, Ni, Mn, Al, Si, Ti and Fe, e.g., lithium cobalt oxide (LCO, for example, $LiCoO_2$), lithium nickel cobalt manganese oxide (NCM, for example, $Li[Ni(x)Co(y)Mn(z)]O_2$), lithium manganese oxide (LMO, for example, $LiMn_2O_4$, $LiMnO_2$), lithium iron phosphate (LFP, for example, $LiFePO_4$), lithium nickel oxide (LNO, for example, $LiNiO_2$), and the like.

The negative electrode may include a negative electrode active material that allows reversible intercalation and deintercalation of lithium ions. Examples of such negative electrode active materials include crystalline or amorphous carbon, or carbonous negative electrode active materials of carbon composites (thermally decomposed carbon, coke, graphite), combusted organic polymer compounds, carbon fibers, tin oxide compounds, lithium metals, or alloys of lithium and other elements. Examples of amorphous carbon may include hard carbon, coke, mesocarbon microbead (MCMB) baked at 1500° C., mesophase pitch-based carbon fiber (MPCF) baked at 1500° C., and the like. Examples of crystalline carbon may include graphite materials, specifically natural graphite, graphitized coke, graphitized MCMB, graphitized MPCF, and the like. In an implementation, the negative electrode may be a crystalline or amorphous carbon electrode.

The positive electrode or negative electrode may be produced by dispersing an electrode active material, a binder, and a conductive material in a solvent to produce an electrode slurry composition, followed by depositing the slurry composition on an electrode current collector. A thickener may be included in the electrode slurry composition.

The positive electrode current collector may be made of aluminum, aluminum alloys, and the like. The negative electrode current collector may be made of copper, copper alloys, and the like. The positive electrode current collector and negative electrode current collector may be prepared in the form of a foil or mesh. As the current collector, a suitable current collector may be used. The positive electrode current collector may include, e.g., aluminum foils, nickel foils, combinations thereof, etc. The negative electrode current collector may include, e.g., copper foils, gold foils, nickel foils, copper alloy foils, combinations thereof, etc.

As the electrolyte of the battery according to the present invention, a suitable electrolyte for electrochemical batteries may be used. The electrolyte may be obtained through dissolution or dissociation of a salt having, for example, a structure of A+ B− in an organic solvent.

The A+ component, that is, the cation, may include, e.g., alkali metal cations such as Li+, Na+, or K+, combinations thereof, etc.

The B− component, that is, the anion, may include, e.g., $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, combinations thereof, etc.

The organic solvent may include, e.g., propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), γ-butyrolactone, etc. These may be used alone or in combination thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES 1 to 4

Preparation of a separator including a coating layer containing a polyvinylidene fluoride homopolymer having a weight average molecular weight of 1,000,000 g/mol or more and inorganic particles having an average particle size of 700 nm or less, and having a density of 1.2 g/cm$^3$ or more

EXAMPLE 1

(1) Preparation of Coating Agent

1) A polyvinylidene fluoride-hexafluoropropylene ('PVdF-HFP') copolymer (21216, Solvay) having a weight average molecular weight of 700,000 g/mol was added in an amount of 10 wt % to acetone (Daejung Chemicals & Metals), followed by stirring at 25° C. for 4 hours using a stirrer to prepare a first polymer solution 2) A polyvinylidene fluoride ('PVdF') homopolymer (5130, Solvay) having a weight average molecular weight of 1,100,000 g/mol was added in an amount of 10 wt % to DMF (Daejung Chemicals & Metals), followed by stirring at 25° C. for 4 hours using a stirrer to prepare a second polymer solution.

3) $Al_2O_3$ particles (LS235, Nippon Light Metal Company, Ltd.) were added in an amount of 25 wt % to acetone (Daejung Chemicals & Metals), followed by milling for dispersion at 25° C. for 3 hours using a bead mill to prepare an inorganic dispersion.

The prepared first polymer solution, second polymer solution, and inorganic dispersion were mixed in a ratio of first polymer solution:second polymer solution:inorganic dispersion:solvent (acetone) of 1:1:3:6, and stirred at 25° C. for 2 hours using a power mixer to prepare a coating agent.

(2) Preparation of Separator

The prepared coating agent was deposited on both sides of a 9 μm thick polyethylene monolayer base film by dip coating and dried to prepare a separator.

EXAMPLE 2

A separator was prepared in the same manner as in Example 1 except that dispersion of the inorganic particles was carried out for 2 hours to prepare an inorganic dispersion in (1) of Example 1.

EXAMPLE 3

A separator was prepared in the same manner as in Example 1 except that dispersion of the inorganic particles was carried out for 1 hour to prepare an inorganic dispersion in (1) of Example 1.

EXAMPLE 4

A separator was prepared in the same manner as in Example 1 except that dispersion of the inorganic particles was carried out for 0.5 hours to prepare an inorganic dispersion in (1) of Example 1.

COMPARATIVE EXAMPLE 1

A separator was prepared in the same manner as in Example 1 except that dispersion of the inorganic particles was carried out using a ball mill for 0.5 hours to prepare an inorganic dispersion in (1) of Example 1.

EXPERIMENTAL EXAMPLE 1

Measurement of Density of Coating Layer

The density of the coating layer in each of the separators prepared in Examples 1 to 4 and Comparative Example 1 was calculated using the thickness and the loading amount of each coating layer.

First, the thickness of each coating layer was measured using a SEM image and a microcaliper.

Then, each of the coating layers was cut into 10 cm (MD)×20 cm (TD) pieces to prepare specimens, each weight of which was measured using an electronic scale, followed by calculating the loading amount of the coating agent.

Then, the density of each of the coating layers was calculated using the thickness and the loading amount of the coating layer. Calculation results of the coating density are given in $g/cm^3$.

The calculation results of the coating density are shown in Table 1.

EXPERIMENTAL EXAMPLE 2

Measurement of Peel Strength Between Coating Layer and Base Film

Each of the coating layers prepared in Examples 1 to 4 and Comparative Example 1 was cut into 1.5 cm×7 cm pieces to prepare a total of ten specimens. Each of the specimens were strongly attached to a glass plate using a transparent double-sided tape (3M), followed by measuring force for separating the coating layer using a tensile strength tester (UTM; Universal Test Machine).

Measurement results of the peel strength are shown in Table 1.

EXPERIMENTAL EXAMPLE 3

Measurement of Adhesive Strength Between Coating Layer and Electrode

Each of the separators prepared in Examples 1 to 4 and Comparative Example 1 was placed and bonded between both electrodes of a lithium rechargeable battery to prepare a battery stack of positive electrode/separator/negative electrode, which in turn was inserted into an aluminum pouch. The positive electrode was a lithium cobalt oxide (LCO) electrode, and the negative electrode was a crystalline carbon electrode.

Then, with an electrolyte injected into the aluminum pouch, the aluminum pouch was sealed and formed into three single-plate cells, which in turn were subjected to a force of 100 $kgf/cm^2$ for 20 seconds at 50° C. and were left for 12 hours.

Next, after disassembling each of the single-plate cells, the battery stack of the positive electrode, the separator and the negative electrode bonded to each other was cut into a size of 1.5 cm (MD)×7 cm (TD) and attached to a glass plate using a transparent double-sided tape (3M), followed by measuring adhesive strength between the coating layer and the electrodes using a tensile strength tester (UTM; Universal Test Machine).

Measurement results of the adhesive strength between the coating layer of the separator and the electrodes are shown in Table 1.

TABLE 1

| | $Al_2O_3$ average particle size (nm) | Loading amount in coating layer ($g/m^2$) | Thickness of coating layer (μm) | Density of coating layer ($g/cm^3$) | Peel strength ($gf/cm^2$) | Adhesive strength to electrodes ($gf/cm^2$) |
|---|---|---|---|---|---|---|
| Example 1 | $D_{50}$ = 350 | 8.2 | 4.2 | 1.952 | 450 | 42 |
| Example 2 | $D_{50}$ = 370 | 7.4 | 4.1 | 1.805 | 320 | 35 |
| Example 3 | $D_{50}$ = 410 | 6.8 | 4.4 | 1.545 | 290 | 40 |
| Example 4 | $D_{50}$ = 470 | 6.3 | 5.0 | 1.260 | 180 | 33 |
| Comp. Ex. 1 | $D_{50}$ = 650 | 5.2 | 5.1 | 1.020 | 55 | 15 |

As shown in Table 1, in Examples 1 to 4 wherein the inorganic particles were dispersed using a bead mill for 0.5 hours or more to have an average particle size of 700 nm or less, all of the coating layers had higher densities than that of the coating layer of Comparative Example 1 having a similar thickness ranging from 4 μm to 5 μm, and also had superior adhesive strength and peel strength to the coating layer.

EXAMPLE 5

Preparation of a separator including a coating layer containing a polyvinylidene fluoride homopolymer having a weight average molecular weight of 1,000,000 g/mol or more (1) Preparation of Coating Agent 1) A polyvinylidene fluoride-hexafluoropropylene ('PVdF-HFP') copolymer (Solvay) having a weight average molecular weight of 700,000 g/mol was added in an amount of 10 wt % to acetone (Daejung Chemicals & Metals), followed by stirring at 25° C. for 4 hours using a stirrer to prepare a first polymer solution 2) A polyvinylidene fluoride ('PVdF') homopolymer (Solvay) having a weight average molecular weight of 1,100,000 g/mol was added in an amount of 10 wt % to DMF (Daejung Chemicals & Metals), followed by stirring at 25° C. for 4 hours using a stirrer to prepare a second polymer solution.

3) $Al_2O_3$ particles (Nippon Light Metal Company, Ltd.) were added in an amount of 25 wt % to acetone (Daejung Chemicals & Metals), followed by milling for dispersion at 25° C. for 3 hours using a ball mill to prepare an inorganic dispersion.

The prepared first polymer solution, second polymer solution and inorganic dispersion were mixed in a ratio of first polymer solution:second polymer solution:inorganic dispersion:solvent (acetone) of 1:1:3:6, and stirred at 25° C. for 2 hours using a power mixer to prepare a coating agent.

(2) Preparation of Separator

The prepared coating agent was deposited on both sides of a 16 μm thick polyethylene monolayer base film by dip coating and dried to prepare a separator, which had a coating agent loading amount of 12 g/m² and a 8 μm thick coating layer.

COMPARATIVE EXAMPLES 2 to 4

Preparation of a separator including a coating layer containing a polyvinylidene fluoride homopolymer having a weight average molecular weight of less than 1,000,000 g/mol

COMPARATIVE EXAMPLE 2

A separator was prepared in the same manner as in Example 1 except that a PVdF homopolymer having a weight average molecular weight of 500,000 g/mol was used in (1) of Example 5.

COMPARATIVE EXAMPLE 3

A separator was prepared in the same manner as in Example 1 except that a PVdF homopolymer having a weight average molecular weight of 700,000 g/mol was used in (1) of Example 5.

COMPARATIVE EXAMPLE 4

A separator was prepared in the same manner as in Example 1 except that a PVdF homopolymer having a weight average molecular weight of 900,000 g/mol was used in (1) of Example 5.

EXPERIMENTAL EXAMPLE 4

Measurement of Thermal Shrinkage of Separator

Each of the separators prepared in Example 5 and Comparative Examples 2 to 4 was cut into 5 cm×5 cm pieces to prepare a total of 10 specimens. Each of the specimens was left in a chamber at 150° C. for 1 hour, followed by measuring degrees of shrinkage of each specimen in MD and TD directions to calculate thermal shrinkage.

Measurement results of the thermal shrinkage are shown in Table 2.

EXPERIMENTAL EXAMPLE 5

Measurement of Peel Strength Between Coating Layer and Base Film

The peel strength between each of the coating layers prepared Example 5 and Comparative Examples 2 to 4 and the base film was measured in the same manner as in Experimental Example 2.

Measurement results of the peel strength are shown in Table 2.

EXPERIMENTAL EXAMPLE 6

Measurement of Adhesive Strength Between Coating Layer and Electrode

The adhesive strength between each of the coating layers prepared Example 5 and Comparative Examples 2 to 4 and the base film was measured in the same manner as in Experimental Example 3.

Measurement results of the adhesive strength are shown in Table 2.

TABLE 2

| | Thermal shrinkage of separator (%) | Peel strength between coating layer and base film (gf/cm²) | Adhesive strength between coating layer and electrode (gf/cm²) |
|---|---|---|---|
| Example 5 | 15 | 100 | 42 |
| Comparative Example 2 | 28 | 20 | 8 |
| Comparative Example 3 | 25 | 35 | 13 |
| Comparative Example 4 | 25 | 45 | 17 |

As shown in Table 2, it can be seen that the separator prepared in Example 5 using the PVdF-HFP copolymer having a weight average molecular weight of 700,000 g/mol and the PVdF homopolymer having a weight average molecular weight of 1,000,000 g/mol demonstrated better results in terms of all test items including thermal shrinkage, peel strength, and adhesive strength, than the separators prepared in Comparative Examples 2 to 4 wherein the PVdF-HFP copolymer, and the PVdF homopolymer having a molecular weight of less than 1,000,000 g/mol were used.

The peel strength between the coating layer and the base film gradually increased with increasing weight average molecular weight of the PVdF homopolymer and abruptly increased by about 2.2 times when the PVdF homopolymers having weight average molecular weights of 900,000 g/mol and 1,100,000 g/mol were used. Thus, a PVdF homopolymer having a weight average molecular weight of about 1,000,000 g/mol or more may be used according to an embodiment. Thus, a sufficiently high peel strength may be provided. Adhesive strength between the coating layer and electrodes of a battery also exhibited a similar tendency to the peel strength.

By way of summation and review, a separator for an electrochemical battery may be a middle layer disposed inside a battery to isolate a positive electrode and a negative electrode from each other while maintaining ionic conductivity to permit charge and discharge of the battery. The separator of a battery may be designed to have a slim thickness and a light weight while ensuring high adhesion and shape stability based on high heat resistance in order to produce high capacity batteries.

A separator may include a coating layer of an organic/inorganic mixture formed on one or both sides of a base film by coating inorganic particles and an organic binder polymer thereon. Such a separator may exhibit improved heat resistance and adhesion according to components of the coating layer. The thickness of the separator may increase due to the coating layer. When such a separator is applied to a battery, ionic conductivity of an electrolyte in the battery may decrease, thereby causing increase in resistance of the battery. When the coating layer is thickly formed to ensure effects of the coating layer, such a problem may become severe. The coating layer of the separator may be formed by depositing inorganic particles on a base film vulnerable to heat, and the coating layer can exhibit improved heat dissipation. However, when the amount of the inorganic particles is increased in order to increase heat dissipation, the amount of an organic binder may be relatively lowered in the coating layer, thereby deteriorating adhesion of the separator. In this case, adhesion between the coating layer and electrodes may be weakened so that force of the coating layer suppressing thermal shrinkage of the base film may decrease, which may make it less effective at preventing a short circuit between a positive electrode and a negative electrode upon overheating of the battery.

As described above, a separator according to an embodiment may provide a slim structure while ensuring high peel strength and high adhesion to electrodes. A polyvinylidene fluoride homopolymer as an organic binder component of a coating agent may improve adhesion of a coating layer. According to embodiments, the separator may include a coating layer which exhibits strong adhesion and has high density, and may provide a slim structure and excellent capability in prevention of short circuit between electrodes of a battery. The separator may provide a desirable thickness to prevent an excessive increase in resistance while exhibiting thermal stability and strong adhesion through the coating layer formed thereon. The coating layer may contain a sufficient amount of inorganic particles while ensuring strong adhesion. In formation of the coating layer on the separator, a polyvinylidene fluoride homopolymer may be used as an organic binder component of a coating agent, which may improve adhesion of the coating layer. Embodiments may also provide a battery manufactured using the separator, which may improve lifespan, stability, and capacity while providing a slim structure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A separator, comprising:
a polyolefin base film; and
a coating layer, the coating layer containing inorganic particles having an average particle size of 1 nm to 700 nm and an organic binder of a polyvinylidene fluoride homopolymer that has a weight average molecular weight of 1,000,000 g/mol or more, and a polyvinylidene fluoride-hexafluoropropylene copolymer that has a weight average molecular weight of 800,000 g/mol or less, the coating layer having a density of 1.2 g/cm$^3$ to 2 g/cm$^3$, the coating layer being disposed on one or both sides of the base film.

2. The separator as claimed in claim 1, wherein the polyvinylidene fluoride homopolymer has a weight average molecular weight of 1,000,000 g/mol to 1,200,000 g/mol.

3. The separator as claimed in claim 1, wherein the coating layer includes, based on 100 parts by weight of the coating layer in terms of solid content,
5 to 10 parts by weight of the polyvinylidene fluoride homopolymer;
5 to 20 parts by weight of the polyvinylidene fluoride-hexafluoropropylene copolymer; and
70 to 90 parts by weight of the inorganic particles.

4. The separator as claimed in claim 1, wherein the coating layer has a thickness of 10 μm or less.

5. The separator as claimed in claim 1, wherein the inorganic particles include one or more of $Al_2O_3$ particles, $SiO_2$ particles, $B_2O_3$ particles, $Ga_2O_3$ particles, $TiO_2$ particles, or $SnO_2$ particles.

6. The separator as claimed in claim 1, wherein the polyolefin base film is selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

7. The separator as claimed in claim 1, wherein the coating layer has a peel strength of 50 gf/cm$^2$ or more.

8. The separator as claimed in claim 1, wherein an adhesive strength between the coating layer and electrodes of a battery is 20 gf/cm$^2$ or more.

9. The separator as claimed in claim 8, wherein the battery is a lithium rechargeable battery.

10. The separator as claimed in claim 9, wherein:
the electrodes include a positive electrode and a negative electrode,
the positive electrode is selected from the group of a lithium cobalt oxide electrode, a lithium nickel cobalt manganese oxide electrode, a lithium manganese oxide electrode, a lithium iron phosphate electrode, and a lithium nickel oxide electrode, and
the negative electrode is selected from the group of a crystalline carbon electrode and an amorphous carbon electrode.

11. An electrochemical battery, comprising:
a positive electrode;
a negative electrode;
the separator as claimed in claim 1; and
an electrolyte.

12. The electrochemical battery as claimed in claim 11, wherein the electrochemical battery is a lithium rechargeable battery.

\* \* \* \* \*